Nov. 7, 1950   E. L. FICKETT ET AL   2,529,332

INDEXING MECHANISM FOR MACHINE TOOLS

Filed April 10, 1944   4 Sheets-Sheet 1

INVENTORS
Ernest L. Fickett
Charles F. Wissenbach
BY Charles R. Fay
atty

Nov. 7, 1950  E. L. FICKETT ET AL  2,529,332
INDEXING MECHANISM FOR MACHINE TOOLS

Filed April 10, 1944  4 Sheets-Sheet 2

INVENTORS
Ernest L. Fickett
Charles F. Wissenbach
BY Charles R. Fay
atty

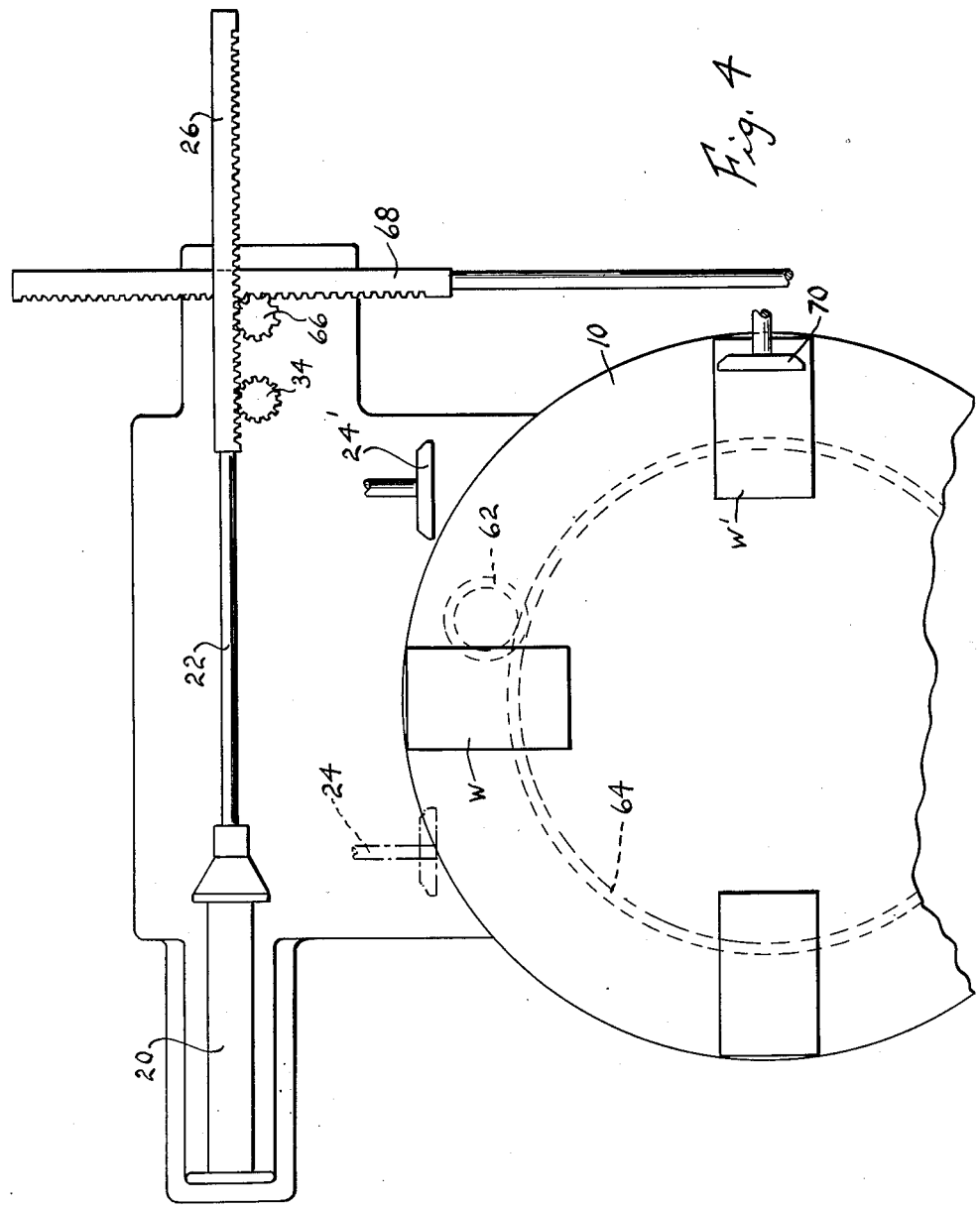

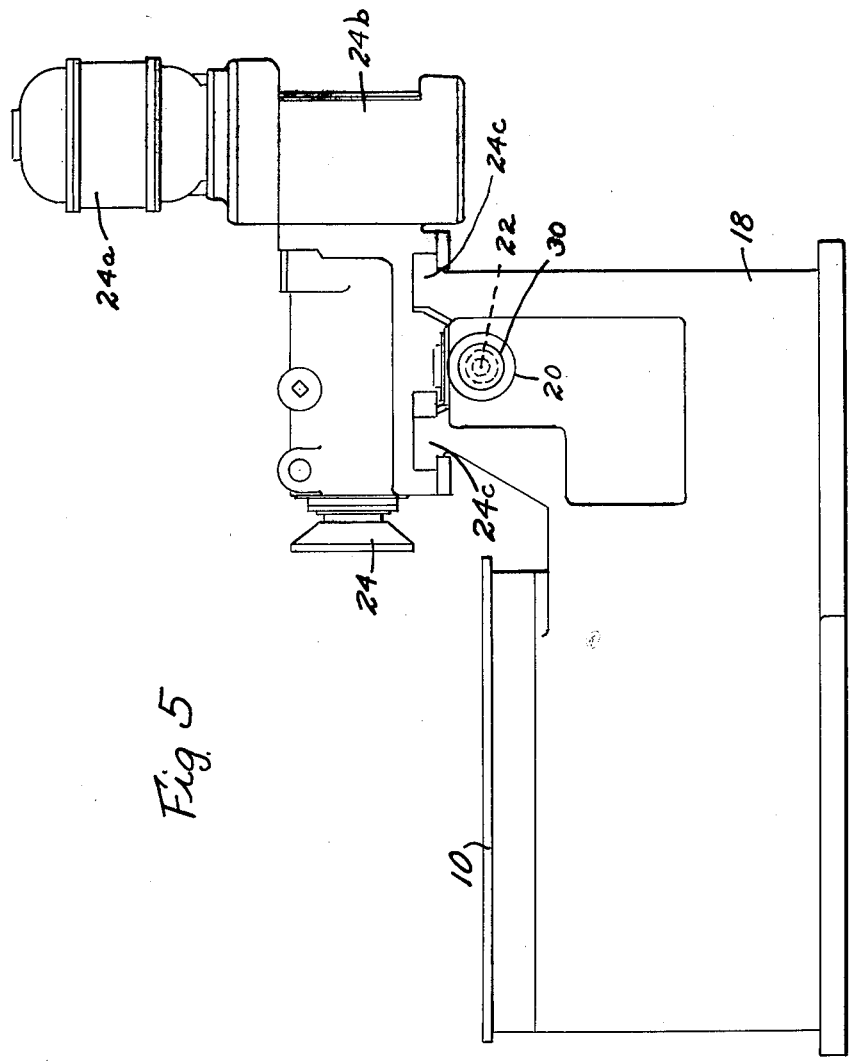

Patented Nov. 7, 1950

2,529,332

UNITED STATES PATENT OFFICE 2,529,332

INDEXING MECHANISM FOR MACHINE TOOLS

Ernest L. Fickett, Fitchburg, and Charles F. Wissenbach, Bolton, Mass., assignors to Fitchburg Engineering Corporation, a corporation of Massachusetts Application April 10, 1944, Serial No. 530,380

7 Claims. (Cl. 29—38)

1

This invention relates to a special indexing mechanism for a machine tool of the type having a movable work carriage adapted to move unidirectionally in combination with a cutter carriage having a reciprocating motion to work on pieces one after the other as they are indexed on the work table.

Objects of the invention include a device of the class described having a movable work table for accommodating several pieces of work at different stations thereon in combination with a reciprocating tool which is adapted to be traveled to work on a work piece, and to be retracted at the same time the table is indexed to bring a following work piece into position for the next working travel of the cutter.

Further objects of the invention include the provision of a rotary work table having a plurality of work piece stations thereon, said work table being indexed by means of a mechanism driven by a cutter carriage traveling means, the indexing taking place after the working stroke of the cutter and being completed prior to the next following working stroke; the provision of an indexing mechanism as described in which the cutter travels tangentially with respect to a rotary work table and including means for indexing the latter during the retracting stroke of the cutter whereby the retraction of the cutter commences approximately simultaneously with the start of the indexing motion in order that the piece just worked upon will travel out of the way of the cutter in its retracting movement; and the provision of a mechanism as above described comprising a plurality of cutters operating simultaneously on different work pieces on the same work table and so arranged that the table is indexed during the retraction of all the cutters, thus completely avoiding contact of the work piece by the cutter during the indexing of the work table.

Other objects and advantages of the invention will appear hereinafter.

Reference is to be had to the accompanying drawings, in which

Fig. 4 is a top plan view of a machine shown in diagrammatic form and illustrating the application of the invention to a multiple tool machine; and Fig. 5 is a view in side elevation showing the relation of the tool to the rotary table.

2

Figure 1:
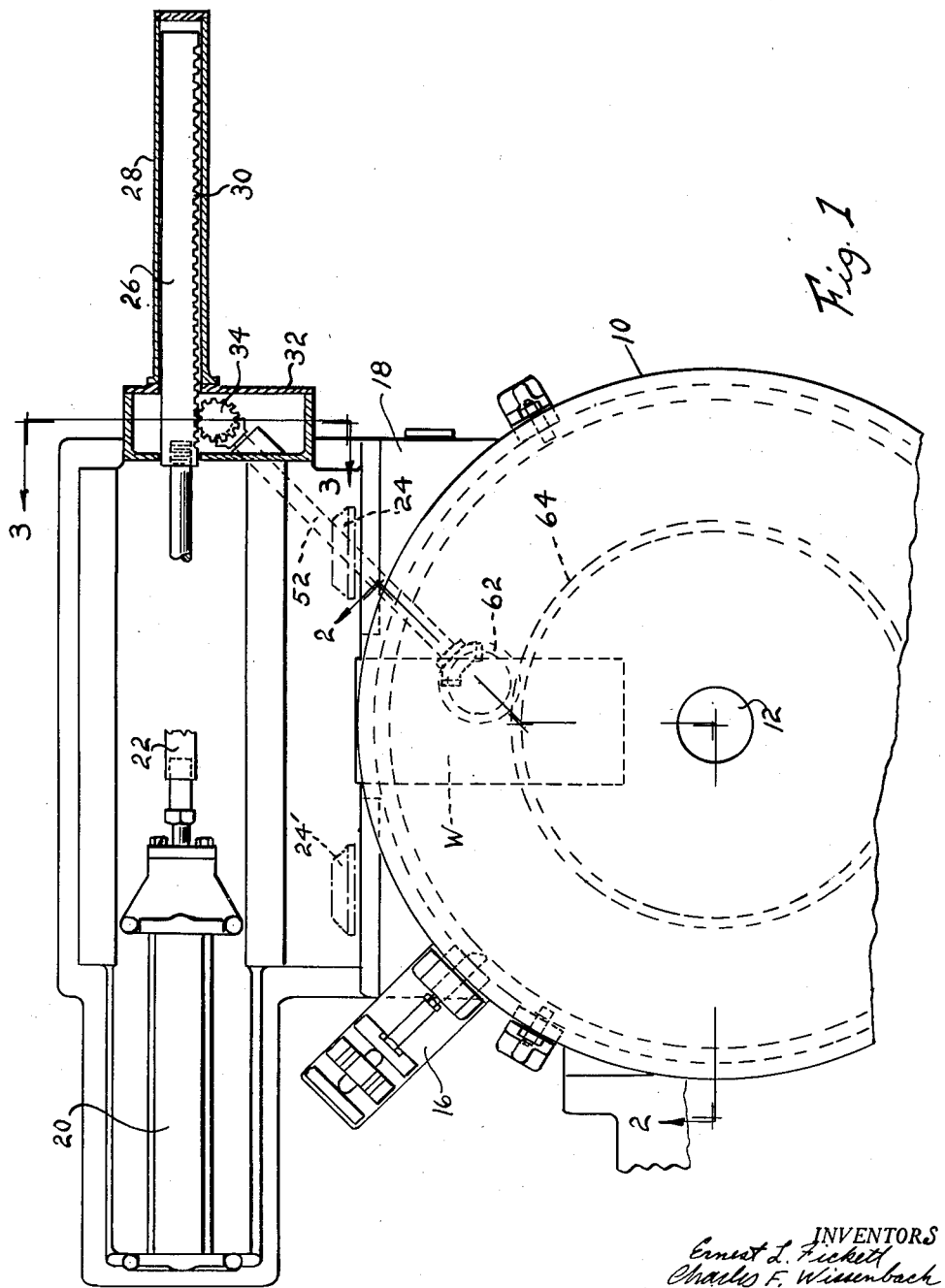
Fig. 1 is a top plan view of a machine embodying the invention, parts being broken away and in section.

In the drawings there is shown a rotatable work table 10 which is mounted in any convenient or desired manner on a base and designed to rotate in a horizontal plane on a vertical axle at 12. This table is designed to accommodate a plurality of work pieces at different stations thereon, these work pieces being clamped to the table by any desired or convenient means not shown. A locking pin of ratchet type is shown generally at 16 and although this pin is necessary for holding the table in position during the operation of the cutter, it forms no part of the present invention.

The base of the machine is indicated at 18 and on this same base, or on a separate base if desired, there is mounted a motor 20 for reciprocating a rod 22 on which a cutter 24 may be mounted for reciprocation thereby. The element 22 extends beyond the cutter 24 and has secured thereto a rack 26 which is slidably mounted on a housing 28 and provided with teeth 30. The cutter 24 is driven from a motor 24a mounted on a bracket 24b slidable on ways 24c, as shown in Fig. 5. The motor and bracket are not shown in Fig. 1 as they would obscure the ways, the motor 20, and rod 22. It is clear that as the motor 20 reciprocates the cutter, the rack 26 is also simultaneously reciprocated.

Figure 3:
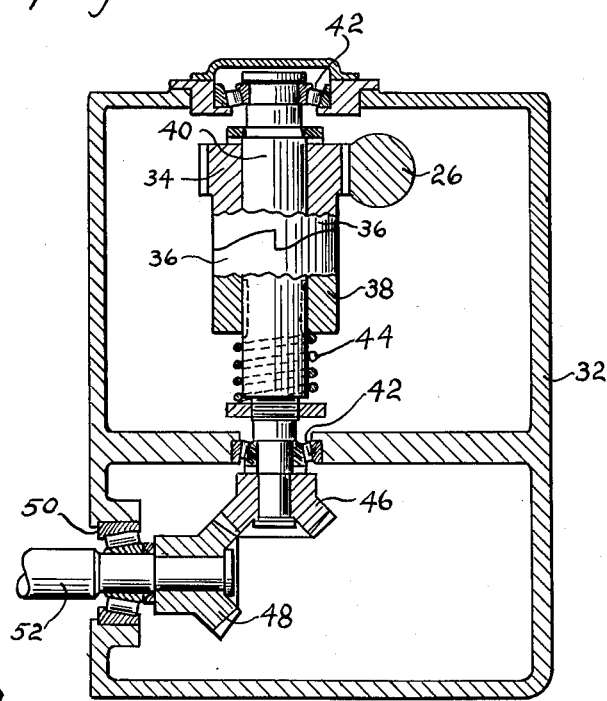
Fig. 3 is a section on line 3—3 of Fig. 1.

A housing 32 is provided for supporting a pinion wheel 34, see Fig. 3. Pinion wheel 34 meshes with the teeth 30 of rack 26 at all times and the pinion is provided with ratchet teeth 36 cooperating with like teeth on a sleeve 38 in such a manner as clearly shown in Fig. 3 that sleeve 38 will be rotated by the pinion in one direction of rotation only. The pinion is mounted to rotate on a shaft 40, the latter being journaled in bearings 42 in housing 32. A spring 44 constantly urges sleeve 38 into clutching engagement with teeth 36 of the pinion 34 and therefore it will be seen that rack 26 will rotate shaft 40 in one direction only of its movement.

Shaft 40 is provided with a beveled gear 46 meshing with a corresponding gear 48 journaled at 50 in a wall of housing 32 and driving the shaft 52.

Figure 2:
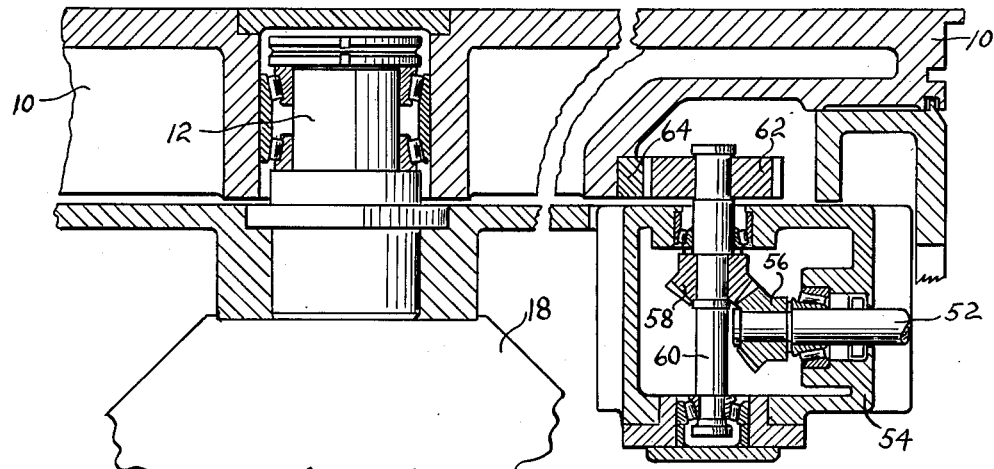
Fig. 2 is a section on line 2—2 of Fig. 1.

Shaft 52 is journaled in a housing 54 mounted on the machine base in any desired manner and having a gear 56 driven thereby and meshing with a gear 58 fast to a jack shaft 60 also journaled in housing 54, see Fig. 2. The shaft 60 is provided with a pinion 62 meshing with a ring gear 64 secured to the table 10 as shown.

In the operation of the device a clamped work piece W, one of a plurality on the surface of the work table, assumes the position shown in Fig.

1 at which time the element 22 is extended and the cutter 24 is at its right hand position. The motor 20 then moves the tool 24 to the left to perform its operation on work piece W and the end of the cutter stroke is indicated at 24'. During the travel of the cutter, rack 26 has of course moved to its left hand position which is shown in Fig. 1 and has rotated the pinion 34. This action however has no effect upon the table because of the fact that the teeth 36 merely cams the sleeve 38 downwardly and shaft 40 therefore does not rotate. However, as the motor 20 travels the cutter and element 22 together in the opposite direction with rack 26, pinion 34 is rotated in the opposite direction thus clutching with sleeve 38 and rotating shaft 40, this action resulting in a rotation of shaft 52 and the pinion 62. By this means the table is indexed an amount depending on the length of the stroke of the rack. The degree of indexing, however, can be varied by using different racks having a different number of teeth 30 thereon.

The above described mechanism will insure that the table is automatically indexed to bring a new work piece into position to be operated upon by the cutter and the result is that work piece W, in Fig. 1, moves in a clockwise direction away from the cutter which is in the 24' position so that the work piece is completely out of the way of the cutter as it is retracted and the new work piece advancing, arrives at the position of the work piece W in Fig. 1 only after the cutter has reached its right hand position as shown. The effect of this construction is that each work piece is held in the operating position during the working traverse of the cutter but on retraction of the cutter there can be no interference between the latter and the work piece, the cutter moving during this action between two work pieces and being kept away from both of them.

In Fig. 4 the construction is substantially the same and the corresponding parts are so labeled, but some parts have been omitted for clarity of illustration. However, in this modification of the device the rack 26 also actuates another pinion 66 in both directions and pinion 66 meshes with another rack 68 so as to traverse a second cutter 70 whereby work piece W' is acted upon by cutter 70 similar with the action of cutter 24 on work piece W. Otherwise the operation of the device is the same as that above described and the showing of Fig. 4 is to illustrate the manner in which a plurality of tools may be used simultaneously with the indexing mechanism of the present case. As many cutters may be used as desired since the construction shown in Fig. 4 may be carried on as far as is desired and any number of cutters can be travelled by similar mechanism multiplied.

Having thus described our invention and the advantages thereof, we do not wish to be limited to the details herein disclosed, otherwise than as set forth in the claims, but what we claim is:

1. A machine tool comprising a circular work carriage adapted to hold a plurality of work pieces, means to rotate the work carriage in a predetermined direction, a tool carriage, means to advance and retract the latter tangent to a circle whose center is coincident with that of the work carriage, means connected to said tool carriage and to said work carriage traveling means to travel the work carriage in said predetermined direction only, under influence of said tool carriage advancing and retracting means, and means inhibiting the operation of said work carriage traveling means on the advance stroke of the tool carriage.

2. In a machine of the class described, a substantially flat rotary work table, a rectilinearly reciprocable tool carriage, means to reciprocate the latter in a plane parallel to the plane of the work table and tangent to a circle whose center coincides with that of the work table, means to rotate the work table in one direction only, a driving connection to said last named means from the tool carriage operable to rotate the work table during the retraction of the tool carriage, said table being stationary during the working traverse of the tool carriage.

3. A machine of the character described comprising an indexible work table for supporting a plurality of work plates, a tool mounted for reciprocatory movement in a rectiliner path tangent to a circle having its center in the axis of rotation of the table, means for reciprocating said tool in alternate operating and non-operating strokes, means connected to and driven by said last means and including a one-way clutch for indexing said work table in one direction only on the return non-operating stroke of the tool whereby the work piece previously operated upon is moved in advance of and out of the path of the tool on its non-operating stroke.

4. In a machine of the character described, a rotary work table having a plurality of working stations each adapted to accommodate a work piece thereat, a reciprocable tool carriage having a rectilinear path adapted to intersect the path of the work carried by said table, said path being tangent to a circle whose center is in the axis of rotation of said work table, a tool carried by said carriage, means for reciprocating said tool carriage and tool to and fro between a pair of terminal positions in alternate working and return strokes, means for supporting the table stationary with a work piece in the path of the tool during reciprocation of the tool carriage in one direction whereby the work piece is acted upon by said tool, and means for moving the table with the work piece which has been engaged by the tool in advance of the tool on return movement of the tool carriage and for simultaneously advancing a fresh work piece to a position to be acted on by the tool on the next working stroke thereof.

5. A machine tool comprising a rotary work table having a plurality of work holders each adapted to accommodate a work piece, a reciprocatory tool movable to and fro in a rectilinear path which intersects the path of the work carried by said table between a pair of terminal portions in alternate working and return strokes, said rectilinear path being tangent to a circle concentric with the axis of rotation of said table, means for actuating said tool in said rectilinear path, means for supporting said table stationary with the work piece in the path of said tool during movement of the tool in one direction, and means for moving said table with the workpiece which has been engaged by the tool in advance of the tool on the return stroke of said tool and for simultaneously moving a fresh work piece into position for engagement by the tool on the next working stroke thereof.

6. A machine tool comprising a rotary work table having a plurality of work holders each adapted to accommodate a work piece, a reciprocatory tool movable to and fro in a rectilinear path which intersects the path of the work carried by said table between a pair of terminal portions in alternate working and return strokes said rectilinear path being tangent to a circle concentric with the axis of rotation of said table, means for actuating said tool in said rectilinear path, means for supporting said table stationary with the work piece in the path of said tool during movement of the tool in one direction, and means for moving said table with the work piece which has been engaged by the tool in advance of the tool on the return stroke of said tool and for simultaneously moving a fresh work piece into position for engagement by the tool on the next working stroke thereof, said table moving means being interconnected with the tool reciprocating means through the medium of a one-way clutch.

7. In a device of the class described, a rotary unidirectional movable work carriage, a plurality of stations on the same, a reciprocating tool carriage, means to reciprocate the tool carriage tangent to a circle where center is coincident with that of the work carriage, means connected to and operated by said tool carriage to move the work carriage, means disconnecting said second named means on movement of the tool carriage in one direction, and a second reciprocating tool carriage traveled by said tool carriage simultaneously therewith and operating on a separate work piece on the work carriage.

ERNEST L. FICKETT.
CHARLES F. WISSENBACH.

REFERENCES CITED

The following references are of record in the file of this patent:

UNITED STATES PATENTS

| Number | Name | Date |
| --- | --- | --- |
| 312,019 | Salisbury | Feb. 10, 1885 |
| 1,033,857 | Zimmermann | July 30, 1912 |
| 1,293,913 | Potter | Feb. 11, 1919 |
| 1,426,552 | Cross | Aug. 22, 1922 |
| 1,516,984 | Perkins et al. | Nov. 25, 1924 |
| 1,859,111 | Rock | May 17, 1932 |
| 1,902,520 | Randles | Mar. 21, 1933 |
| 1,919,738 | Melling | July 25, 1933 |
| 1,924,594 | Blood et al. | Aug. 29, 1933 |
| 2,073,111 | Lindgren | Mar. 9, 1937 |
| 2,090,649 | Tetreault | Aug. 24, 1937 |

FOREIGN PATENTS

| Number | Country | Date |
| --- | --- | --- |
| 57,419 | Germany | July 21, 1891 |
| 473,440 | Germany | Mar. 16, 1929 |